(12) United States Patent
Nakata (10) Patent No.: US 10,616,500 B2
(45) Date of Patent: Apr. 7, 2020

(54) IMAGE PICKUP APPARATUS THAT USES IMAGING AREA HAVING BETTER CHARACTERISTICS, AND METHOD OF ADJUSTING THE SAME

(71) Applicant: CANON KABUSHIKI KAISHA, Tokyo (JP)

(72) Inventor: Takamichi Nakata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 15/961,192

(22) Filed: Apr. 24, 2018

(65) Prior Publication Data

US 2018/0316839 A1    Nov. 1, 2018

(30) Foreign Application Priority Data

Apr. 28, 2017    (JP) .................................. 2017-089678

(51) Int. Cl.
| | | |
|---|---|---|
| H04N 5/238 | (2006.01) | |
| H04N 5/232 | (2006.01) | |
| H04N 5/367 | (2011.01) | |
| H04N 5/217 | (2011.01) | |
| H04N 5/357 | (2011.01) | |

(52) U.S. Cl.
CPC ............ *H04N 5/238* (2013.01); *H04N 5/217* (2013.01); *H04N 5/2176* (2013.01); *H04N 5/23258* (2013.01); *H04N 5/23287* (2013.01); *H04N 5/23296* (2013.01); *H04N 5/3572* (2013.01); *H04N 5/3675* (2013.01)

(58) Field of Classification Search
CPC ...... H04N 5/238; H04N 5/217; H04N 5/2176; H04N 5/23258; H04N 5/23287; H04N 5/23296; H04N 5/3572; H04N 5/3675
See application file for complete search history.

(56) References Cited

U.S. PATENT DOCUMENTS

2013/0141603 A1*   6/2013   Imada ................ H04N 5/23254
                                                            348/208.6
2018/0160081 A1*   6/2018   Ren ......................... G01S 3/325

FOREIGN PATENT DOCUMENTS

JP          2003189189 A       7/2003

* cited by examiner

*Primary Examiner* — Nicholas G Giles
(74) *Attorney, Agent, or Firm* — Rossi, Kimms & McDowell LLP

(57) ABSTRACT

An image pickup apparatus that uses an area of an image pickup device, which has better characteristics, as an imaging area. The image pickup apparatus includes an image pickup optical system having a fish-eye lens. An image pickup device is movable relative to the image pickup optical system, and converts an object image formed through the image pickup optical system to electric signals. A characteristic detection section acquires characteristics of the image pickup device, and an imaging position detection section acquires an imaging position of the object image on the image pickup device. A target position to which the image pickup device is to be moved is determined based on the acquired characteristics of the image pickup device, and the acquired imaging position.

11 Claims, 9 Drawing Sheets

| DEFECTIVE PIXEL TYPE | SINGLE DEFECTIVE PIXEL | PLURAL CONNECTED DEFECTIVE PIXELS | DENSE DEFECTIVE PIXELS |
|---|---|---|---|
| EVALUATION VALUE | 1 | 5 | 10 |

FIG. 6

| SHADING LUMINANCE DIFFERENCE | LUMINANCE DIFFERENCE > 5% | LUMINANCE DIFFERENCE > 10% | LUMINANCE DIFFERENCE > 20% |
|---|---|---|---|
| EVALUATION VALUE | 1 | 5 | 10 |

IMAGE PICKUP APPARATUS THAT USES IMAGING AREA HAVING BETTER CHARACTERISTICS, AND METHOD OF ADJUSTING THE SAME

BACKGROUND OF THE INVENTION

Field of the Invention

The present invention relates to an image pickup apparatus that is equipped with an image pickup optical system including a fish-eye lens and uses an imaging area having better characteristics, and a method of adjusting the same.

Description of the Related Art

In recent years, in the field of image pickup apparatuses, such as monitoring cameras, a so-called omnidirectional camera that includes a fish-eye lens and is capable of monitoring the entire area surrounding the camera, is drawing attention. The image pickup apparatus of this type causes an object image to be formed using the fish-eye lens, and hence the object image is formed such that part of an image pickup device is cut out therefrom. Incidentally, the image pickup devices are sometimes different in their own characteristics due to variation in the workmanship of production or circuit configuration. Examples of the characteristics include existence of defective pixels which cause abnormal pixel outputs, and occurrence of dark shading e.g. due to the circuit configuration of the image pickup device. It is difficult to completely prevent occurrence of defective pixels, and hence there have been proposed techniques for correcting defective pixels using various methods. Japanese Laid-Open Patent Publication (Kokai) No. 2003-189189 discloses a technique for determining a defective pixel by comparing a difference in signal level from surrounding pixels with two threshold values, and correcting the defective pixel using signals of the surrounding pixels.

However, in the technique disclosed in Japanese Laid-Open Patent Publication (Kokai) No. 2003-189189, since the defective pixel is corrected using the surrounding pixels, the pixel at a boundary portion may be erroneously corrected. Particularly, if defective pixels densely exist, the possibility of erroneous correction increases. When using a fish-eye lens, in general, only part of effective pixels of the image pickup device is used as an area where an object image is formed, and hence there is room for improvement from the viewpoint of acquisition of an excellent image.

SUMMARY OF THE INVENTION

The present invention provides an image pickup apparatus that uses an area of an image pickup device, which has better characteristics, as an imaging area, and a method of adjusting the image pickup apparatus.

In a first aspect of the present invention, there is provided an image pickup apparatus comprising an image pickup optical system including a fish-eye lens, an image pickup device that is configured to be capable of moving a position thereof relative to the image pickup optical system, and converts an object image formed through the image pickup optical system to electric signals, a first acquisition unit configured to acquire characteristics of the image pickup device, a second acquisition unit configured to acquire an imaging position of the object image on the image pickup device, and a determining unit configured to determine a target position to which the image pickup device is to be moved, based on the characteristics of the image pickup device acquired by the first acquisition unit, and the imaging position acquired by the second acquisition unit.

In a second aspect of the present invention, there is provided a method of adjusting an image pickup apparatus including an image pickup optical system including a fish-eye lens, and an image pickup device that is configured to be capable of moving a position thereof relative to the image pickup optical system, and converts an object image formed through the image pickup optical system to electric signals, the method comprising acquiring characteristics of the image pickup device, acquiring an imaging position of the object image on the image pickup device, and determining a target position to which the image pickup device is to be moved, based on the acquired characteristics of the image pickup device, and the acquired imaging position.

According to the present invention, it is possible to use an area of the image pickup device, which has better characteristics, as an imaging area.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
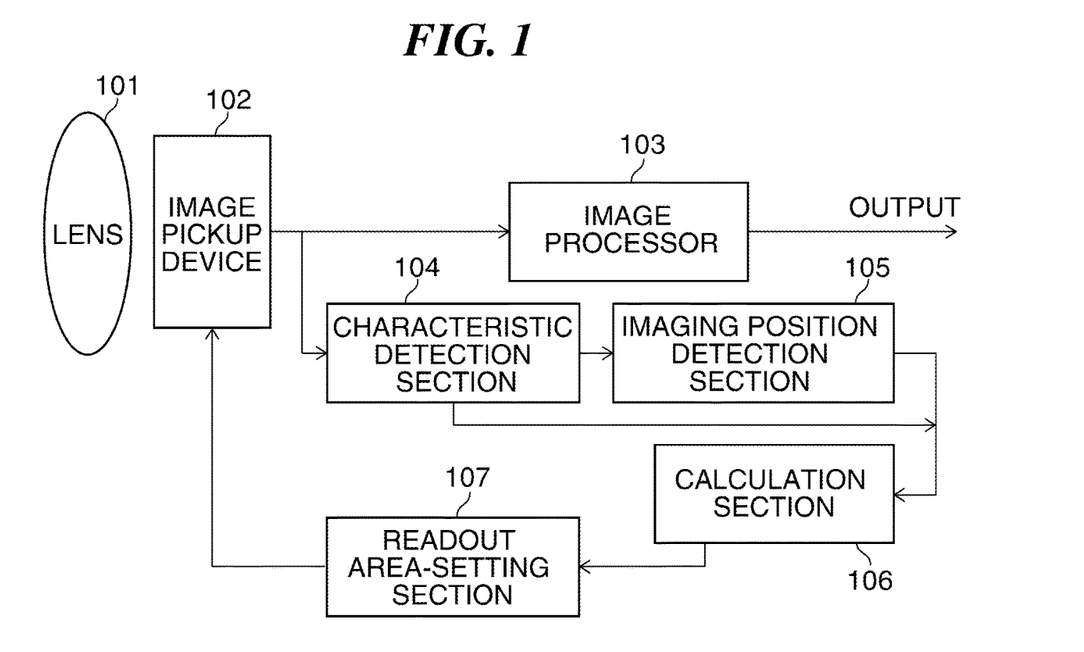
FIG. 1 is a block diagram of an image pickup apparatus according to a first embodiment of the present invention.

FIG. 1 is a block diagram of an image pickup apparatus according to a first embodiment of the present invention. This image pickup apparatus has an image pickup optical system including a lens 101 which is a fish-eye lens. An object image, not shown, enters an image pickup device 102, such as a CCD or a CMOS sensor, through the lens 101. The object image formed on the image pickup device 102 is converted to electric signals, and then converted to digital signals (image signals) by an analog-to-digital converter, and the digital signals are input to an image processor 103. The image processor 103 performs predetermined image processing on an image represented by the input digital signals, such as gamma correction and color balance adjustment. The image on which the predetermined image processing has been performed is output to an output device, a storage device, or the like.

A characteristic detection section 104 (first acquisition unit) detects and acquires device characteristics particular to the image pickup device 102, such as position information of defective pixels of the image pickup device 102 and information on shading of the image pickup device 102. An imaging position detection section 105 (second acquisition unit) detects a position on an imaging surface of the image pickup device 102, where an object image acquired by the lens 101 is formed, i.e. an imaging position of the object image. A calculation section 106 (determining unit) determines, based on outputs from the characteristic detection section 104 and the imaging position detection section 105, a target position to which the image pickup device 102 is to be moved. For example, the calculation section 106 calculates a target position (a moving direction and a moving amount from the current position) of the image pickup device 102 such that the imaging position becomes a position where the number of defective pixels is smallest. A readout area-setting section 107 sets an area on the image pickup device 102 from which signals are read out. For example, the readout area-setting section 107 sets an area including an object image formed on the image pickup device 102 having been moved to the target position determined by the calculation section 106, i.e. an imaging area, as a readout area.

Although not shown, the image pickup apparatus includes not only a CPU that controls the overall operation of the image pickup apparatus, but also a storage section, such as a RAM and a ROM, and the functions of the above-mentioned processing sections are realized by cooperative operations of the CPU and the storage section. The ROM stores control programs executed by the CPU. Further, in a case where information on device characteristics particular to the image pickup device 102 has been stored in the storage section, such as the ROM, in advance, the characteristic detection section 104 can acquire the information from the storage section.

Figure 2:
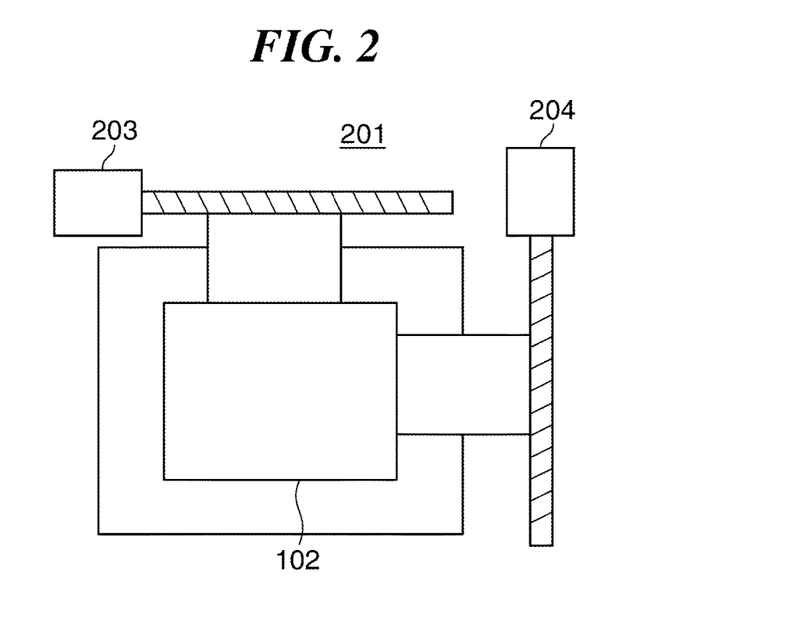
FIG. 2 is a schematic diagram of a mechanism for driving an image pickup device.

FIG. 2 is a schematic diagram of a drive mechanism for driving the image pickup device 102. The image pickup device 102 is constructed as a movable device. The drive mechanism includes a motor 203 for driving the image pickup device 102 in a horizontal direction and a motor 204 for driving the image pickup device 102 in a vertical direction, and the image pickup device 102, the motor 203, and the motor 204 form an image pickup unit 201. The image pickup unit 201 is capable of moving the image pickup device 102 by operating the motors 203 and 204 to thereby bring the image pickup device 102 to a desired position on a plane coordinate system perpendicular to an optical axis of the lens 101. The drive mechanism, illustrated here by way of example, moves the image pickup device 102 along the horizontal and vertical axes. However, there may be employed a drive system that moves the image pickup device 102 forward and rearward in the optical axis direction or a drive system that rotates the image pickup device 102 on the plane coordinate system, instead or in combination, insofar as the drive system is in a face-to-face relationship with a photographing optical system, in other words, insofar as the optical axis of the photographing optical system is perpendicular to the drive system. Note that the image pickup device 102 may be moved manually or automatically. In a case where the image pickup device 102 is automatically moved, the above-mentioned CPU controls the motors 203 and 204. Although in the example illustrated in FIG. 2, the motors 203 and 204 are employed as actuators for automatically driving the image pickup device, piezoelectric elements, for example, may be used as the actuators. Alternatively, by providing a simple screw or the like, the image pickup apparatus may be configured such that the image pickup device 102 can be manually driven by a user.

Figure 3:
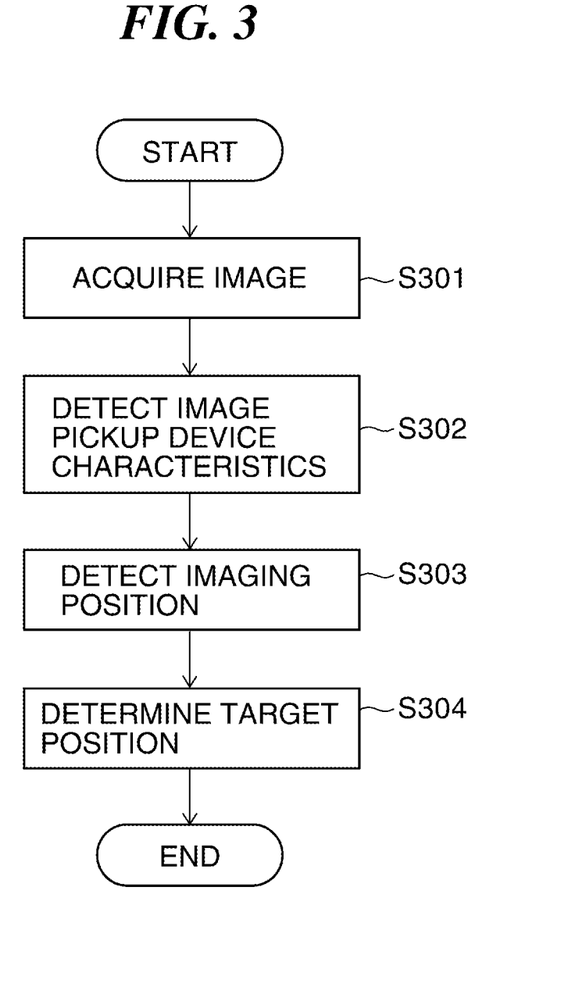
FIG. 3 is a flowchart of an imaging position adjustment process.

Next, a description will be given of an imaging position adjustment process for determining a target position based on the characteristics of the image pickup device 102 and an imaging position, and adjusting the imaging position. This process is assumed to be executed before shipment of the image pickup apparatus as a product, but may be executed after shipment. FIG. 3 is a flowchart of the imaging position adjustment process. This process is realized by the CPU executing the control program stored in the aforementioned ROM and loaded into the aforementioned RAM.

First, the characteristic detection section 104 acquires an entire image of the image pickup device 102, including a formed image (step S301). The entire image is also acquired by the image processor 103. Next, the characteristic detection section 104 detects the device characteristics (step S302). In the present embodiment, the characteristic detection section 104 acquires information on defective pixels, stored e.g. in the ROM in advance, as the device characteristics. At this time, the characteristic detection section 104 sends the device characteristics to the calculation section 106, and sends the entire image of the image pickup device 102 to the imaging position detection section 105. Next, the imaging position detection section 105 detects an imaging position of an object image (an imaging area and a center position of the imaging area) on the image pickup device 102 based on the image acquired in the step S301 (step S303). Although the imaging position detection section 105 acquires the imaging position from the image information, the imaging position detection section 105 may calculate and acquire the imaging position based on a positional relationship between the lens 101 and the image pickup device 102.

Next, the calculation section 106 determines a target position to which the image pickup device 102 is to be moved, based on an output from the characteristic detection section 104 (device characteristics) and an output from the imaging position detection section 105 (imaging position) (step S304). Here, first, the calculation section 106 determines the target position on condition that the imaging area of the object image to be formed after moving the image pickup device 102 to the target position is within an area of effective pixels (effective pixel area) of the image pickup device 102. The calculation section 106 determines the target position (calculates a moving direction and a moving amount of the image pickup device 102) such that in addition to satisfaction of the above condition, the number of defective pixels in the imaging area is smaller after moving the image pickup device 102 to the target position than before moving the image pickup device 102. Most desirably, the calculation section 106 determines the target position such that the imaging position becomes a position where the number of defective pixels included in the imaging area is the smallest. The target position is defined with reference to a predetermined position of the imaging area (e.g. the center position), and for example, the target position is defined by the moving direction and the moving amount from the center position of the imaging area before moving the image pickup device 102 to the center position of the imaging area after moving the image pickup device 102. Then, the imaging position adjustment process in FIG. 3 is terminated. To notify an adjusting person of the target position, information indicative of the target position (the moving direction and the moving amount from the current position) may be displayed on a display section, not shown.

After execution of the imaging position adjustment process in FIG. 3, the adjusting person moves the image pickup device 102 to the target position using the drive mechanism (see FIG. 2). Alternatively, the CPU controls the drive mechanism to move the image pickup device 102 to the target position. The readout area-setting section 107 changes the setting of the readout area such that the imaging area on the image pickup device 102 moved to the target position becomes a new readout area. By moving the image pickup device 102 to the target position, it is possible to use an area on the image pickup device 102, which has better characteristics, whereby the device characteristics concerning the defective pixels are improved, and hence it is possible to reduce the influence of the defective pixels on an output image.

According to the present embodiment, since the target position is determined based on the device characteristics and the imaging position, it is possible, for example, to use an area on the image pickup device, which has better characteristics, as the imaging area. By determining the target position such that the number of defective pixels is reduced to a minimum, it is possible to reduce erroneous correction and erroneous recognition of an object, etc., caused by defective pixels, whereby it is possible to provide an image which is improved in recognition performance, compared with the conventional techniques.

Next, a description will be given of a second embodiment of the present invention. In the second embodiment, the calculation section 106 determines a target position, by taking into consideration not only the information on defective pixels, but also information on luminance unevenness on the imaging surface, as the device characteristics. The present embodiment is distinguished from the first embodiment in an imaging position adjustment process which is described hereinafter with reference to FIG. 4 in place of FIG. 3, and a method of determining the target position, which is described hereinafter with reference to FIGS. 5 and 6. The imaging position adjustment process in the present embodiment is assumed to be performed before shipment of the image pickup apparatus as a product.

Figure 4:
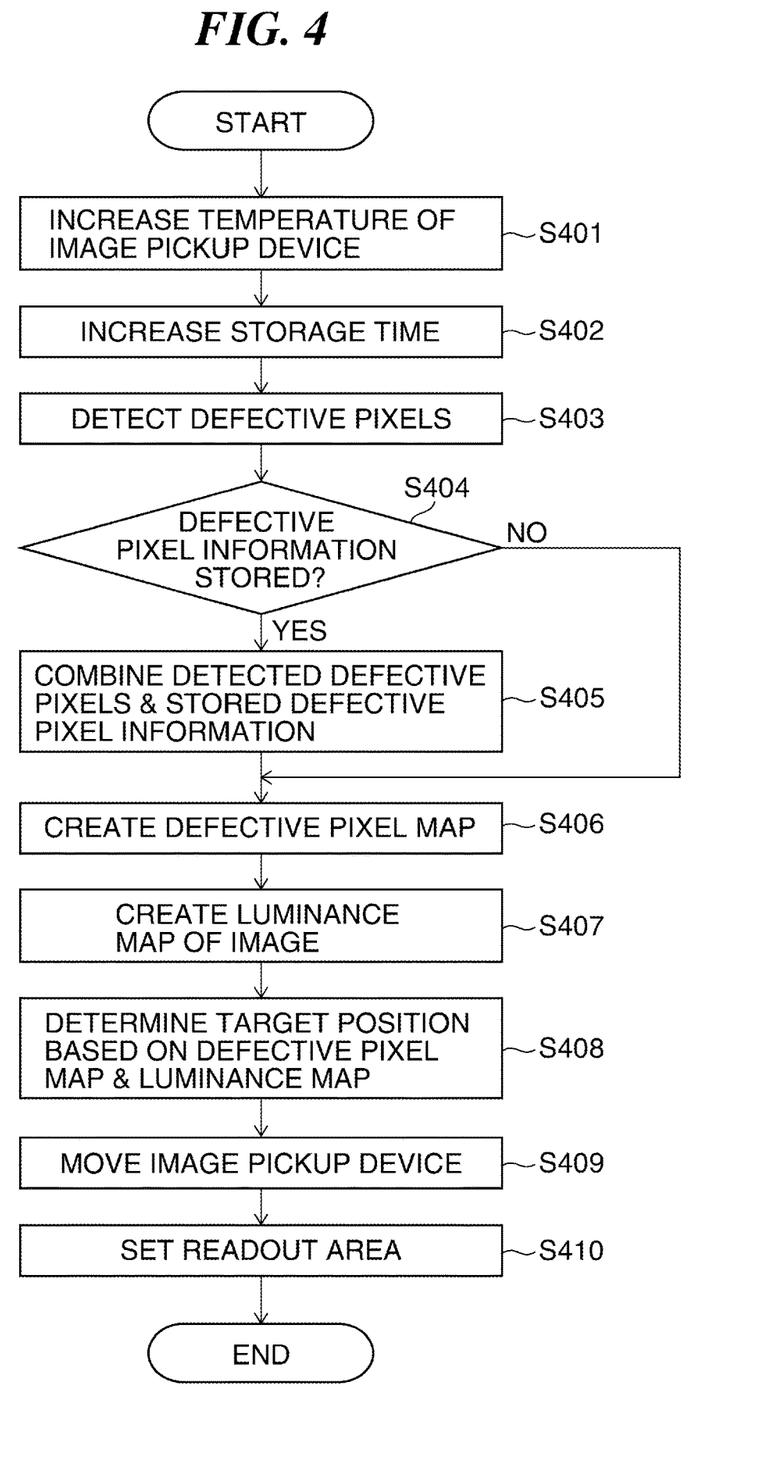
FIG. 4 is a flowchart of an imaging position adjustment process performed in a second embodiment of the present invention.

FIG. 4 is a flowchart of the imaging position adjustment process performed in the second embodiment. This process is performed e.g. by an adjusting person of the factory using information equipment, such as a PC. First, the adjusting person increases the ambient temperature of the image pickup device 102 (step S401). The ambient temperature is increased with reference to a temperature which is assumed to be reached when each product is in normal use. Next, the adjusting person sets a storage time of the image pickup device 102 to a long time period (step S402). It is assumed here that the storage time is set to the longest storage time in a range within which the product is normally used. Next, the adjusting person detects defective pixels (step S403). The method of detecting defective pixels may be a method of detecting from an image obtained by photographing an object with equally distributed brightness in an angle of view, and a method of detecting from an image obtained through photographing under a pitch dark environment by shielding the image pickup apparatus. However, any other method may be employed insofar as it is possible to detect flaws (defective pixels) from an image. Further, detection of defective pixels may be performed by the characteristic detection section 104. Alternatively, by transferring an image to an information equipment, such as a PC, connected to the image pickup apparatus, detection of defective pixels may be performed by the information equipment.

Steps S404 to S408 are executed by the information equipment according to operations of the adjusting person. The information equipment determines whether or not information on defective pixels has been stored in advance (step S404). Although the information on defective pixels is assumed to be stored in a nonvolatile memory (not shown), such as a flash memory, included in the image pickup apparatus, this is not limitative, but this information may be stored in any other storage section included in the information equipment. If the information on defective pixels has not been stored in advance, the information equipment proceeds to the step S406. On the other hand, if the information on defective pixels has been stored in advance, the information equipment combines information on defective pixels detected in the step S403 and the stored defective pixel information (step S405), and proceeds to the step S406. In the step S406, the information equipment creates a defective pixel map (a mapping image of defective pixels) indicative of locations of the defective pixels in the effective pixel area of the image pickup device 102. Therefore, in a case where the step S405 is executed, the defective pixel map in which the stored defective pixel information is added to the detected defective pixel information is created. In a case where the step S405 is not executed, the defective pixel map is created only from the detected defective pixel information.

Next, the adjusting person photographs an image by shielding the image pickup apparatus from light, and the information equipment creates a luminance map of the effective pixel area, on which the luminance distribution obtained at this time is mapped (step S407). Note that processing for detecting luminance unevenness on the imaging surface as the device characteristics may be performed by the characteristic detection section 104. Then, the information equipment determines the target position based on the defective pixel map created in the step S406 and the luminance map created in the step S407 (step S408). Here, examples of the method of analyzing the defective pixel map and the luminance map, and the method of determining the target position will be described with reference to FIGS. 5 and 6.

Figure 5:
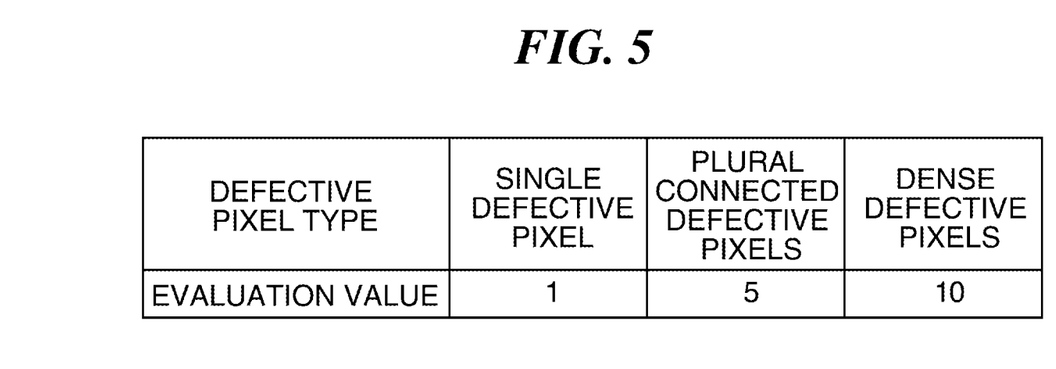
FIG. 5 is a diagram showing an example of a table of relationship between a defective pixel types and an evaluation value.
Figure 6:
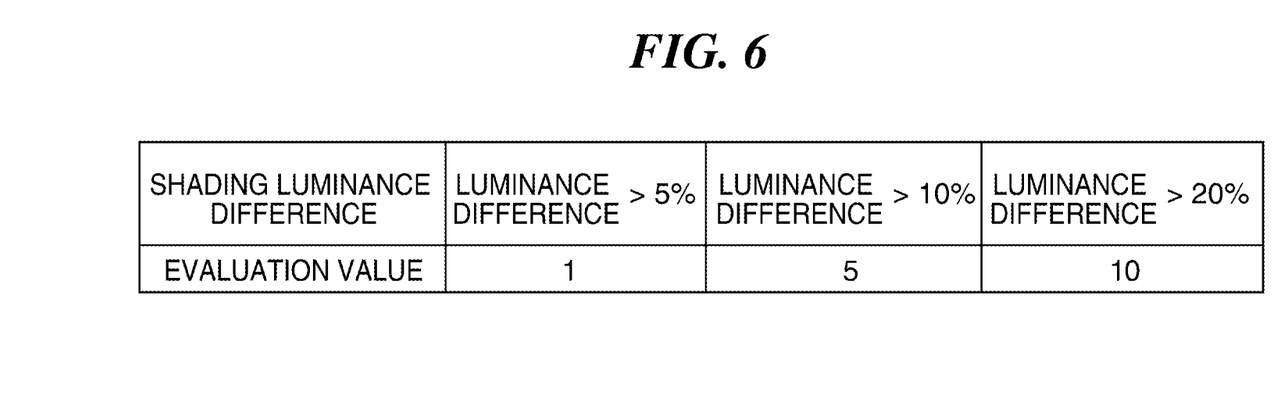
FIG. 6 is a diagram showing an example of a table of relationship between a luminance difference in shading and an evaluation value.

FIG. 5 is a diagram showing an example of a table of relationship between a defective pixel type and an evaluation value. FIG. 6 is a diagram showing an example of a table of relationship between a luminance difference in shading and an evaluation value. Referring to FIG. 5, the defective pixels are classified into three types: a single defective pixel, plural connected defective pixels, and dense defective pixels. The single defective pixel is a defective pixel which singly exists without any problem of surrounding pixels. The plural connected defective pixels are formed by two or more defective pixels adjacent to each other. For example, if one defective pixel has a defective surrounding pixel adjacent thereto in any of longitudinal, lateral, and oblique directions, as viewed from one defective pixel, the one defective pixel and the defective surrounding pixel are detected as the plural connected defective pixels. Note that the plural connected defective pixels may be further classified into two connected defective pixels, three connected defective pixels, and so on. As for the dense defective pixels, in the present embodiment, the defective pixel map is divided into blocks (each covering e.g. 50 pixels×50 pixels), and when a ratio of defective pixels in a block is not lower than a threshold value Th %, the block is determined as the dense defective pixels. Although the threshold value Th can be set as desired, the threshold value Th is assumed to be set to 0.1% or so by way of example. A block size (the number of pixels of each divided area) for dividing the defective pixel map can also be freely set. Definition of the types of the defective pixels is not limited to the above-described example, but may be defined according to a different rule insofar as the defective pixels can be classified into a plurality of types.

Next, an evaluation value is set for each defective pixel type. In the illustrated example in FIG. 5, a value of 1 is set for the single defective pixel, a value of 5 is set for the plural connected defective pixels, and a value of 10 is set for the dense defective pixels, as the evaluation values. As the evaluation value is larger, the degree of defect is higher. The information equipment may normalize the evaluation value by dividing a calculated evaluation value by the number of defective pixels.

On the other hand, as for shading, pixel areas compared with each other for determining a luminance difference for use in correction are each set to a range of 10 pixels×10 pixels or so. This is because if a luminance value is compared on a pixel basis, noise may cause a large luminance difference. In the present embodiment, the information equipment calculates a luminance difference between pixel areas of 10 pixels×10 pixels or so by using a median filter, and sets an evaluation value for each luminance difference. Note that it is only required to eliminate the influence of noise, and hence any other method, such as the method of using a low-pass filter, may be employed. In an example shown in FIG. 6, reference values of the luminance difference in the entire imaging range are set to 5%, 10%, and 20%, and evaluation values of 1, 5, and 10 are set for luminance differences of not less than 5%, not less than 10%, and not less than 20%, respectively.

Then, the information equipment calculates a whole evaluation value by adding the evaluation value acquired by analyzing the defective pixel map to the evaluation value acquired by analyzing the luminance difference in shading. The information equipment determines the target position such that the whole evaluation value of the imaging area of the object image after moving the image pickup device 102 to the target position is smaller (desirably, the smallest) than that before moving the same. With this, the target position is determined such that the characteristics in the imaging area are improved by taking into consideration the defective pixels and the luminance unevenness on the imaging surface as the device characteristics. Note that the target position may be determined by the calculation section 106.

Next, in a step S409, the adjusting person moves the image pickup device 102 to the determined target position. Since the adjustment process is assumed to be performed e.g. in the factory as mentioned above, the adjusting person moves the image pickup device 102 using a jig, such as a screw. Note that the image pickup device 102 may be automatically moved by the information equipment. In a step S410, the information equipment sets the readout area so as to read out signals from the imaging area on the image pickup device 102 which has been moved to the target position. The set value of the readout area is stored in the nonvolatile memory (not shown), such as the flash memory, included in the image pickup apparatus. Note that the readout area may be set by the readout area-setting section 107.

According to the present embodiment, it is possible to obtain the same advantageous effects as provided by the first embodiment in that it is possible to use an area on the image pickup device, which has better characteristics. What is more, since the target position is determined taking not only defective pixels, but also the luminance difference in shading into consideration, it is possible to use an area where defective pixels and luminance unevenness are less, and thereby further improve the recognition performance.

In the present embodiment, the imaging position adjustment process is assumed to be performed at the factory before shipment of the product. However, to realize the imaging position adjustment process, the processing operations may be performed by any of the adjusting person, the information equipment, and the CPU included in the image pickup apparatus, or may be performed by cooperation of any of these.

In the present embodiment, both of the defective pixels and the luminance difference in shading are taken into consideration. However, a predetermined weight may be added to the evaluation value concerning the defective pixels and the evaluation value concerning the luminance difference. Alternatively, the target position may be determined based only on the defective pixels or the luminance difference in shading, according to selection by the adjusting person.

Figure 7:
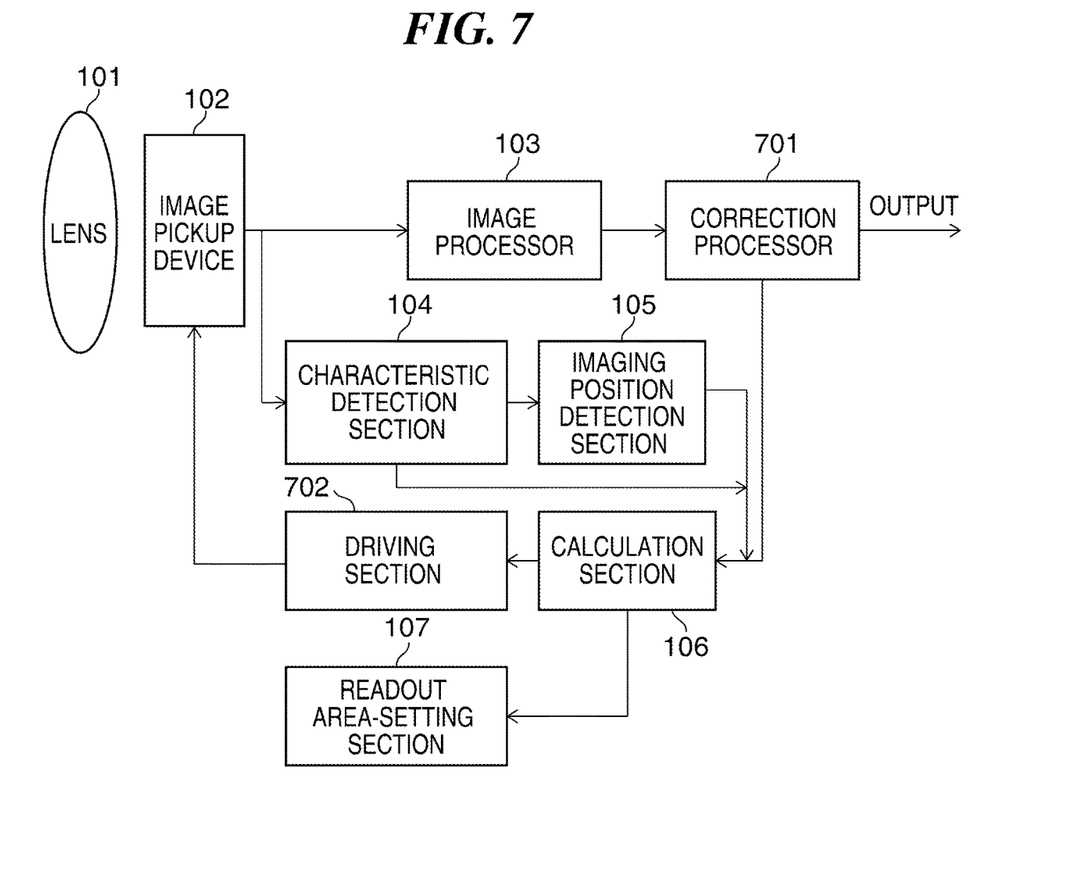
FIG. 7 is a block diagram of an image pickup apparatus according to a third embodiment of the present invention.

Next, a description will be given of an image pickup apparatus according to a third embodiment of the present invention. FIG. 7 is a block diagram of the image pickup apparatus according to the third embodiment. The arrangement of the image pickup apparatus according to the present embodiment differs from that according to the first embodiment in that a correction processor 701 and a driving section 702 are added to the image pickup apparatus shown in FIG. 1, as component elements of the control mechanism. Further, the present embodiment is distinguished from the first embodiment in an imaging position adjustment process which is described hereinafter with reference to FIG. 9 in place of FIG. 3, and a method of determining the target position, which is described hereinafter with reference to FIGS. 8 and 9. The imaging position adjustment process in the present embodiment is assumed to be performed before shipment of the image pickup apparatus as a product, but may be performed before shipment.

The correction processor 701 geometrically corrects distortion of an image input from the image processor 103. On (enabled state)/off (disabled state) of the function of the correction processor 701 can be set by an adjusting person (e.g. a user) as desired. The driving section 702 is implemented by an actuator, such as a motor, and dynamically changes the position of the image pickup device 102 according to the determined target position. The driving section 702 is only required to be capable of moving the image pickup device 102, and may be configured to operate the motors 203 and 204, appearing in FIG. 2.

Figure 8:
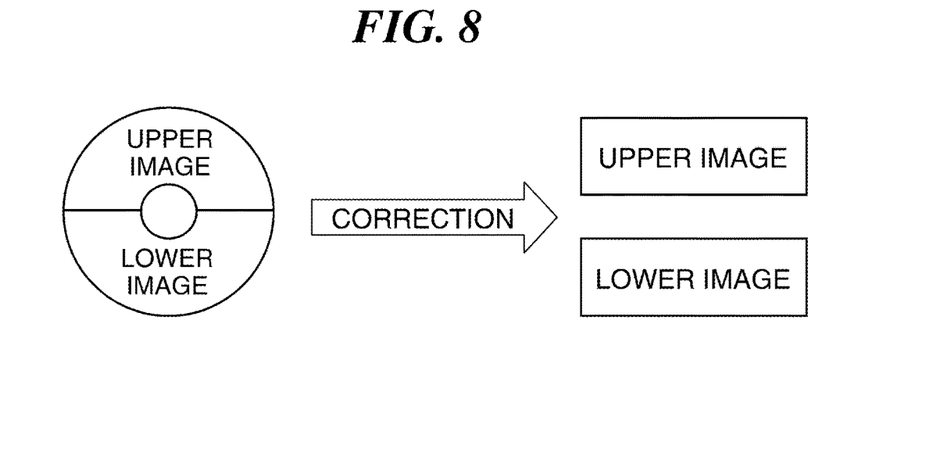
FIG. 8 is a conceptual diagram showing how image distortion is corrected.

FIG. 8 is a conceptual diagram showing how image distortion correction is performed. In general, when an image formed through the fish-eye lens is simply geometrically converted, a central portion of the image is extended by an amount corresponding to the width of the image, and hence the central portion becomes less useful as information. Therefore, the central portion of the image is excluded as shown in FIG. 8, and distortion correction processing is generally performed with respect to the other part except the central portion.

Figure 9:
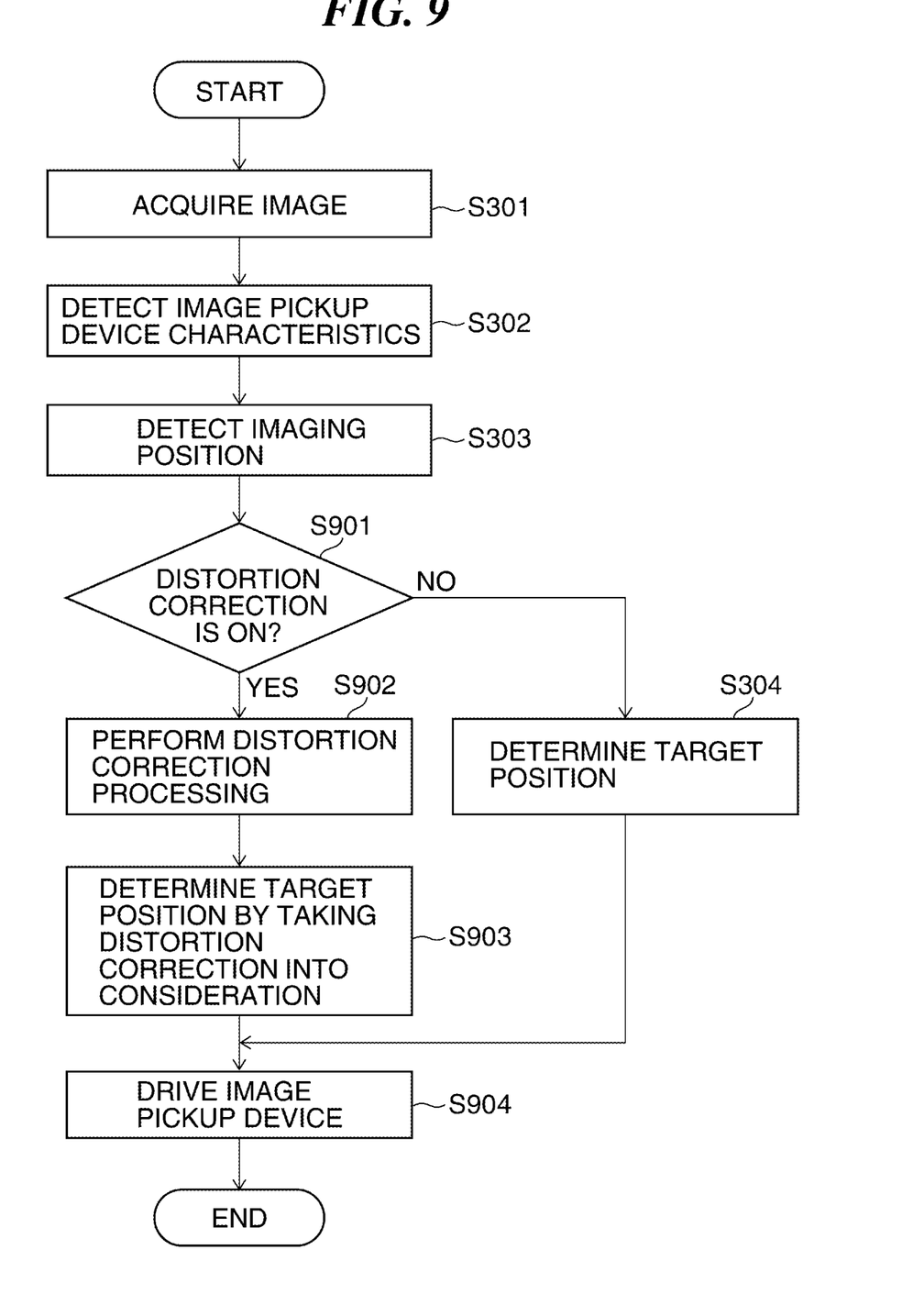
FIG. 9 is a flowchart of an imaging position adjustment process performed by the image pickup apparatus according to the third embodiment.

FIG. 9 is a flowchart of the imaging position adjustment process performed by the image pickup apparatus according to the third embodiment. This process is realized by the CPU executing a control program stored in the aforementioned ROM and loaded into the aforementioned RAM. First, the steps S301 to S303 are the same as those described in the first embodiment (see FIG. 3). After execution of the step S303, in a step S901, the CPU of the image pickup apparatus determines whether or not the function of the correction processor 701 is on (enabled). Then, if the function of the correction processor 701 is off (disabled), the CPU proceeds to the step S304. The step S304 is the same as that described in the first embodiment (see FIG. 3). After that, the process proceeds to a step S904.

On the other hand, if the function of the correction processor 701 is on, the CPU performs distortion correction on the image (step S902). For example, as shown in FIG. 8, the correction processor 701 performs distortion correction with respect to an area except the central portion of the image (an upper-half image and a lower-half image). Next, the calculation section 106 determines the target position by taking distortion correction into consideration (step S903). Note that in determining the target position by taking distortion correction into consideration, the operation sometimes differs particularly depending on whether or not dense defective pixels exist.

Figure 10:
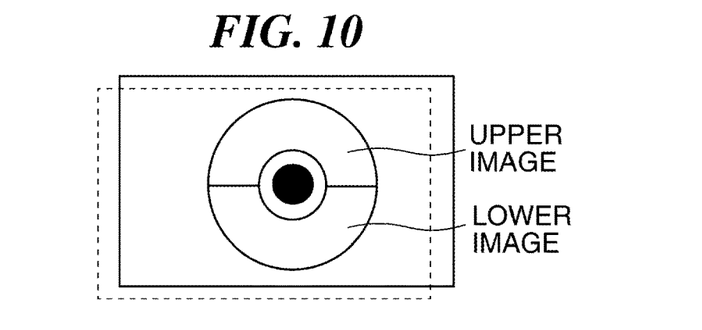
FIG. 10 is a diagram showing an example of an imaging area before and after moving the image pickup device.

FIG. 10 shows an example of an imaging area before moving the image pickup device 102 (indicated by dot lines) and an imaging area after moving the image pickup device 102 to the target position (indicated by solid lines). A black circle in the center indicates dense defective pixels. A largest circle in the center of the screen indicates an area (imaging area of an object image) where an image of the object is formed on the image pickup device 102 appearing in FIG. 8. In a case where the dense defective pixels exist in the central portion of the image pickup device 102, it is difficult to avoid the dens defective pixels from the imaging area. In such a case, when the output image is an image on which distortion correction has been performed, differently from the first and second embodiments, the calculation section 106 determines the target position assuming that the central portion in the imaging area does not indicate a formed image. That is, in a case where the correction processor 701 is used, the calculation section 106 determines the target position such that the device characteristics in an area excluding the central area (predetermined area) in the imaging area of the object image after moving the image pickup device 102 to the target position are improved. Here, the target position is determined such that the number of the defective pixels in the imaging area is reduced. Note that the present embodiment is the same as the first embodiment in that the condition that the target position is determined within the effective pixel area of the image pickup device 102 is to be satisfied. This makes it possible to use an area which has better characteristics in a case where distortion of an image is corrected.

After execution of the step S903, the process proceeds to a step S904. In the step S904, the driving section 702 drives the image pickup device 102 so as to move the same to the target position. After that, the imaging position adjustment process in FIG. 9 is terminated.

According to the present embodiment, it is possible to obtain the same advantageous effects as provided by the first embodiment in that it is possible to use an area on the image pickup device, which has better characteristics, as the imaging area. Particularly, in a case where distortion correction of an image is made use of, the target position is determined by taking the distortion correction into consideration, and hence even when the device characteristics are changed due to aging, radiation, and changes in photographing conditions, such as longer-time storage and higher gains, it is possible to determine a proper target position on a real-time basis. Further, when determining the target position so as to improve the device characteristics in the imaging area, the predetermined area excluded from the imaging area is the central area. This makes it possible to exclude an area which is not used for so-called dewarping correction, and use, for the imaging area, an area which has better characteristics out of an area substantially used.

Although the determination in the step S901 is performed by the CPU, this is not limitative. For example, a user of the image pickup apparatus may perform the determination, and if the function of the correction processor 701 is on, the user may instruct the image pickup apparatus to execute the step S902 et seq.

Figure 11:
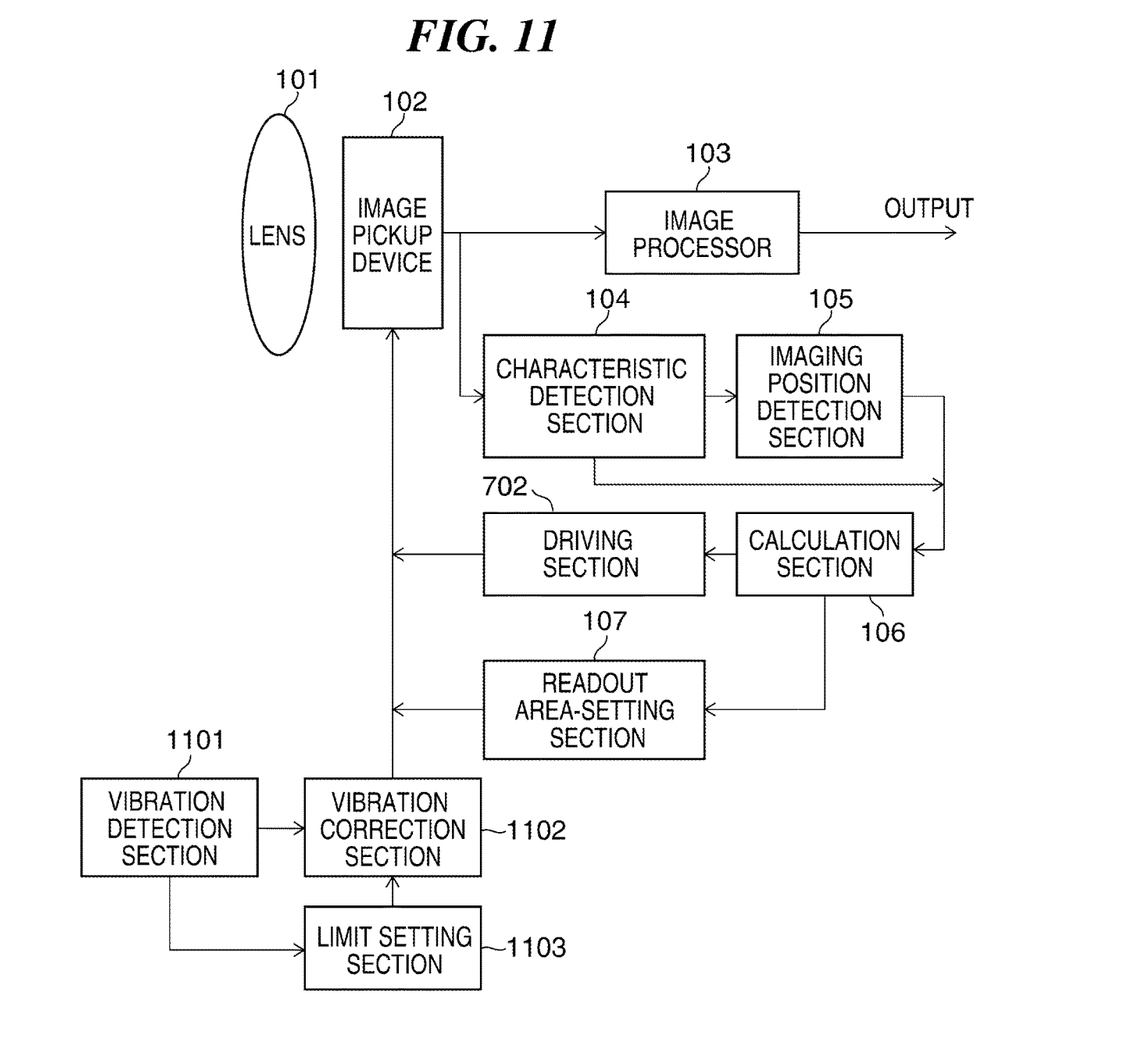
FIG. 11 is a block diagram of an image pickup apparatus according to a fourth embodiment of the present invention.

Next, a description will be given of an image pickup apparatus according to a fourth embodiment of the present invention. FIG. 11 is a block diagram of the image pickup apparatus according to the fourth embodiment. The arrangement of the image pickup apparatus according to the present embodiment differs from that according to the first embodiment in that the driving section 702, a vibration detection section 1101, a vibration correction section 1102, and a limit setting section 1103 are added to the image pickup apparatus shown in FIG. 1, as component elements of the control mechanism. Further, the present embodiment is distinguished from the first embodiment in a imaging position adjustment process which is described hereinafter with reference to FIG. 13 in place of FIG. 3, and a method of determining the target position, which is described hereinafter with reference to FIG. 12. The imaging position adjustment process in the present embodiment is assumed to be performed after shipment of the image pickup apparatus as a product.

The vibration detection section 1101 is implemented e.g. by a gyro sensor, and detects vibration of the image pickup apparatus (camera shake or swing). Note that the method of detecting camera shake is not limited to that using the vibration detection section 1101 or the like, but a vector detection method of detecting an amount of movement of an object based on image information may be used as well. The vibration correction section 1102 realizes a so-called sensor-shift vibration-compensation function for driving the image pickup device so as to cancel out camera shake detected by the vibration detection section 1101.

Figure 12A:
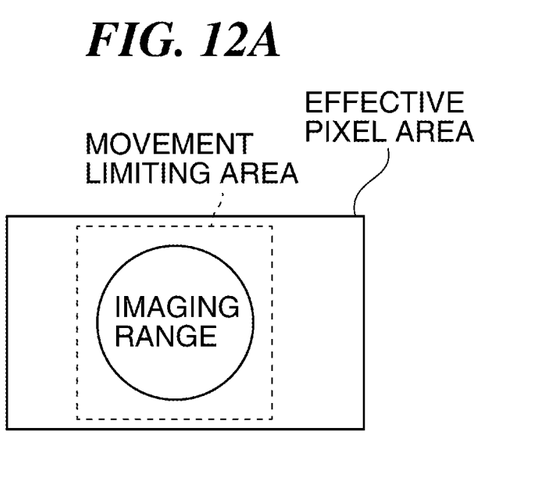
FIG. 12A is a diagram showing an example of a relationship between an effective pixel area and a movement limiting area.

FIG. 12A is a diagram showing an example of a relationship between the effective pixel area of the image pickup device 102 and a movement limiting area set by the limit setting section 1103. The limit setting section 1103 sets a movement limiting area based on the detected camera shake. In doing this, the limit setting section 1103 sets a rectangular movement limiting area within a range which is not wider (equal to or narrower) than the effective pixel area in a vertical direction and a horizontal direction with respect to the optical axis of the image pickup optical system, respectively. In a case where the target position is determined by the method described in the first embodiment and the image pickup device 102 is moved, there is a possibility that the imaging area is moved such that it extends beyond the effective pixel area, due to vibration of the apparatus (camera shake). Therefore, as the camera shake is larger, a margin of space for moving the image pickup device 102 is reduced. In view of this, the movement limiting range is set according to the magnitude of camera shake, whereby the imaging area is moved such that it is accommodated within the effective pixel area even when the vibration-compensation function is operated.

Figure 13:
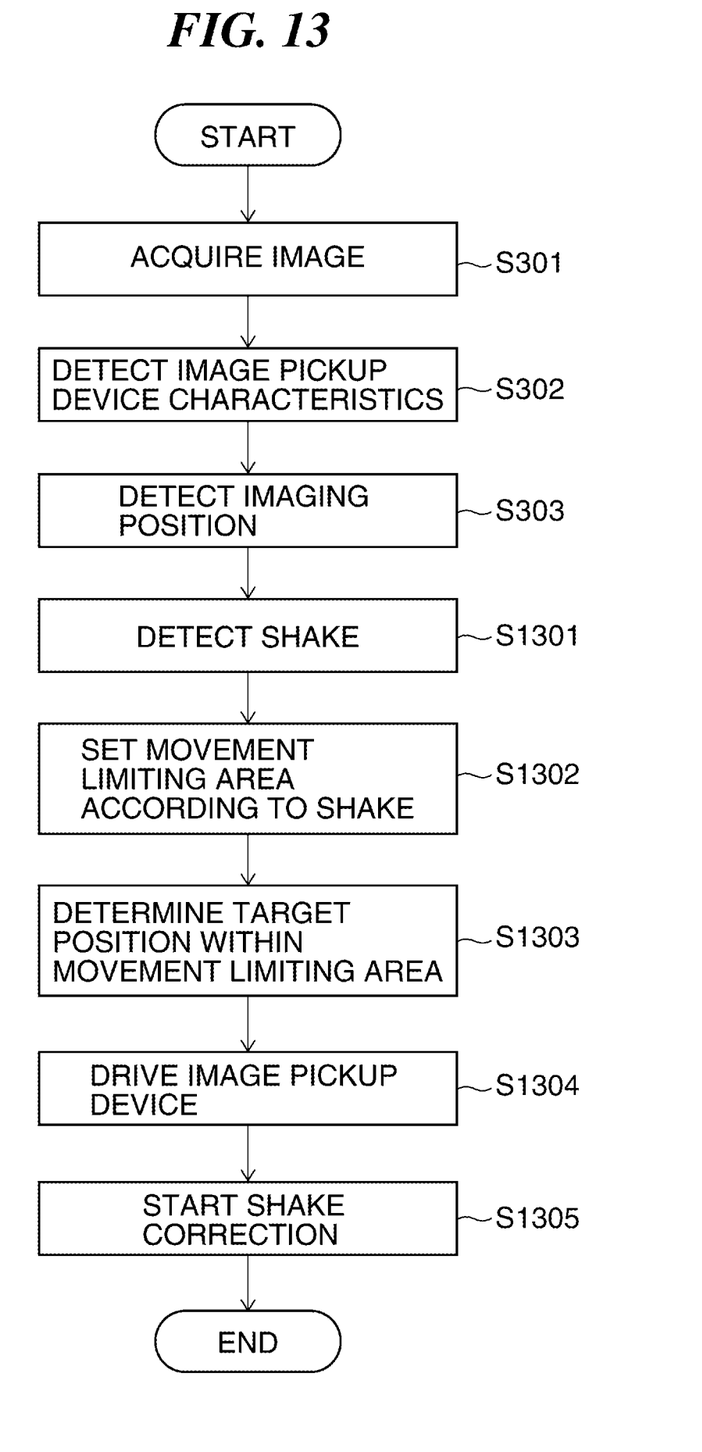
FIG. 13 is a flowchart of an imaging position adjustment process performed by the image pickup apparatus according to the fourth embodiment.

FIG. 13 is a flowchart of an imaging position adjustment process performed by the image pickup apparatus according to the fourth embodiment. This process is realized by the CPU executing a control program stored in the aforementioned ROM and loaded into the aforementioned RAM. The steps S301 to S303 are the same as those described in the first embodiment (see FIG. 3). After execution of the step S303, in a step S1301, the vibration detection section 1101 detects shake (shake amount) of the image pickup apparatus. Next, in a step S1302, the limit setting section 1103 sets the movement limiting area, based on the number of pixels corresponding to the shake amount (referred to as the number of shake corresponding pixels), and a vertical pixel number and a horizontal pixel number of the effective pixels.

Movable ranges considered when setting the movement limiting area will be described with reference to FIGS. 12B to 12D. The position of the center of the imaging area acquired in the step S303 is indicated by G. Movable ranges in the vertical and horizontal directions over which the center position G can be moved relative to the image pickup device 102 are indicated by V and H, respectively. A distance in the vertical direction from the center position G to an edge of the movement limiting area is a distance obtained by adding the movable range V to the diameter of the imaging area. A distance in the horizontal direction from the center position G to an edge of the movement limiting area is a distance obtained by adding the movable range H to the diameter of the imaging area. Note that in a case where no camera shake occurs or is considered, the movable ranges are ranges over which the imaging area can be moved relative to the image pickup device 102 within the effective pixel area, and these ranges define the maximum movable ranges in the vertical direction and the horizontal direction in the movement limiting area. Here, it is assumed that a short side of the image pickup device 102 extends in the vertical direction, and a long side of the same extends in the horizontal direction, and the number of effective pixels of the image pickup device 102 in the horizontal direction is larger than that in the vertical direction. Hereafter, the number of effective pixels in the vertical direction and the number of effective pixels in the horizontal direction are simply referred to as the vertical pixel number and the horizontal pixel number, respectively.

Figure 12B:
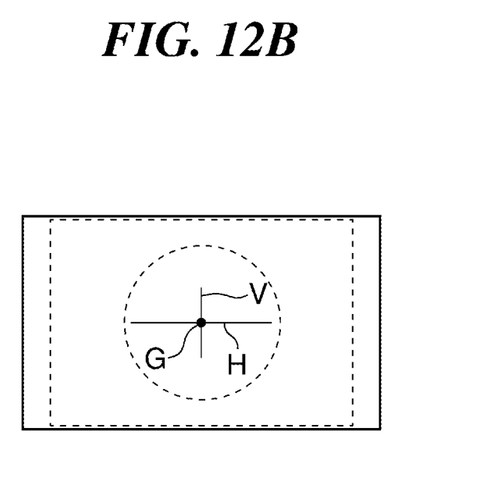
FIGS. 12B to 12D are diagrams showing movable ranges of a center position of an imaging area taken into consideration when setting the movement limiting area.

When the vertical pixel number≥the number of shake corresponding pixels holds, as shown in FIG. 12B, the limit setting section 1103 sets a rectangular area defined by short sides having a length of the movable range V plus the diameter of the imaging area and long sides having a length of the movable range H plus the diameter of the imaging area, as the movement limiting area. The movable range V and the movable range H are set according to the number of shake corresponding pixels, and are set to smaller values as the number of shake corresponding pixels is larger. If the number of shake corresponding pixels=0 (no shake) holds, the movable range V and the movable range H are set to the maximum values, respectively, and the processing for determining the target position is the same as that in the first embodiment. That is, the movement limiting area is set to an area which is equal to the effective pixel area.

Figure 12C:
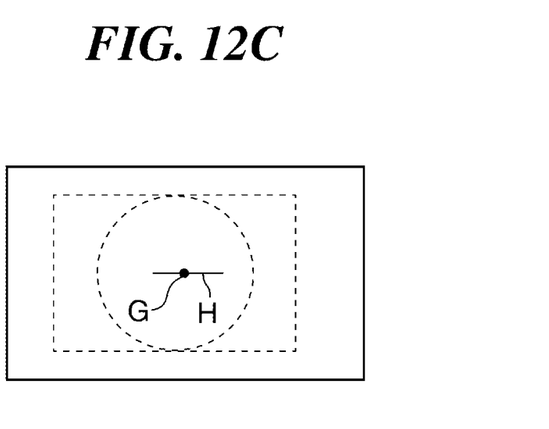

If the horizontal pixel number≥the number of shake corresponding pixels>the vertical pixel number holds, the movable range V is set to 0, and hence as shown in FIG. 12C, the center position G of the imaging area after moving the image pickup device 102 to the target position passes the center of the effective pixel area in the vertical direction. That is, the imaging area can be moved in the horizontal direction, but cannot be moved in the vertical direction.

Figure 12D:
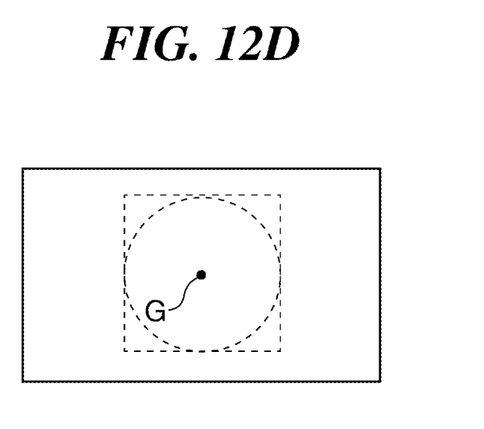

If the number of shake corresponding pixels>the horizontal pixel number holds, the movable range V and the movable range H are both set to 0, and hence as shown in FIG. 12D, the center position G of the imaging area after moving the image pickup device 102 to the target position coincides with the center of the effective pixel area in the vertical direction and the center in the horizontal direction. That is, it is impossible to move the imaging area in neither the vertical direction nor the horizontal direction.

Note that if an image pickup device having short sides extending in the horizontal direction, and long sides in the vertical direction is used, it is necessary to interpret the above description by reversing the relationship between the vertical direction and the horizontal direction. If the number of shake corresponding pixels is larger than the number of pixels along the longer sides, the imaging area cannot be moved.

Next, in a step S1303, the calculation section 106 determines the target position on condition that the imaging area of the object image to be formed after moving the image pickup device 102 to the target position is within the movement limiting area of the image pickup device 102. The present embodiment is the same as the first embodiment (step S304) in that the target position is determined such that the number of defective pixels in the imaging area is smaller (desirably, the smallest) after moving the image pickup device 102 to the target position than before moving the image pickup device 102. Next, in a step S1304, the driving section 702 drives the image pickup device 102 to move the same to the target position. Then, in a step S1305, the vibration correction section 1102 starts shake correction, followed by terminating the process in FIG. 13.

According to the present embodiment, it is possible to obtain the same advantageous effects as provided by the first embodiment in that it is possible to use an area on the image pickup device, which has better characteristics, as the imaging area. What is more, in the image pickup apparatus having the vibration-compensation mechanism, the target position is determined within the movement limiting area set according to camera shake, whereby it is possible to move the image pickup device within a range in which the vibration-compensation function is ensured.

Note that in the above-described embodiments, the image pickup device 102 is only required to be capable of moving its position relative to the image pickup optical system, and the configuration for moving the image pickup optical system to the target position is not excluded.

Note that the configuration for causing luminance unevenness on the imaging surface to be reflected on the determination of the target position, described in the second embodiment, may also be applied to the third and fourth embodiments. Further, the configuration for determining the target position by taking distortion correction into consideration, described in the third embodiment, may also be applied to the second and fourth embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-089678 filed Apr. 28, 2017, which is hereby incorporated by reference herein in its entirety.

What is claimed is:

1. An image pickup apparatus comprising:
an image pickup optical system including a fish-eye lens;
an image pickup device that is configured to be capable of moving a position thereof relative to the image pickup optical system, and converts an object image formed through the image pickup optical system to electric signals; and
one or more processors connected to a memory, the one or more processors being configured to:
acquire characteristics of the image pickup device;
acquire an imaging position of the object image on the image pickup device; and
determine a target position to which the image pickup device is to be moved, based on the acquired characteristics of the image pickup device, and the acquired imaging position,
wherein the characteristics include information on defective pixels included in the image pickup device, and
wherein the target position is determined such that the number of defective pixels in an imaging area of the object image is smaller after moving the image pickup device to the target position than before moving the image pickup device to the target position.

2. The image pickup apparatus according to claim 1, wherein the one or more processors are configured to determine the target position such that an imaging area of the object image after moving the image pickup device to the target position is within an area of effective pixels of the image pickup device, and also the characteristics in the imaging area of the object image are improved after moving the image pickup device to the target position, compared with before moving the image pickup device to the target position.

3. The image pickup apparatus according to claim 1, wherein the characteristics include information on luminance unevenness on an imaging surface of the image pickup device, and
wherein the one or more processors are configured to determine the target position such that the luminance unevenness in an imaging area of the object image is smaller after moving the image pickup device to the target position than before moving the image pickup device to the target position.

4. The image pickup apparatus according to claim 1, wherein the characteristics include information on defective pixels on the image pickup device, and information on luminance unevenness on an imaging surface of the image pickup device, and
wherein the one or more processors are configured to determine the target position such that at least one of the number of defective pixels in an imaging area of the object image and the luminance unevenness in the imaging area of the object image is smaller after moving the image pickup device to the target position than before moving the image pickup device to the target position.

5. The image pickup apparatus according to claim 1, the one or more processors being configured to:
correct distortion of an image output from the image pickup device, and
determine the target position such that the characteristics in an area which is within an area of effective pixels of the image pickup device and is formed by excluding a predetermined area from an imaging area of the object image after moving the image pickup device to the target position, are improved.

6. The image pickup apparatus according to claim 5, wherein the predetermined area is a central area of the imaging area of the object image.

7. The image pickup apparatus according to claim 1, the one or more processors being configured to:
detect shake of the image pickup apparatus,
a setting unit configured to set a movement limiting area which is not wider than the effective pixel area of the image pickup device in each of a vertical direction and a horizontal direction with respect to an optical axis of the image pickup optical system, according to the shake detected by the detection unit, and
determine the target position such that an imaging area of the object image after moving the image pickup device to the target position is within the movement limiting area set by the setting unit.

8. The image pickup apparatus according to claim 1, the one or more processors being configured to drive the image pickup device to the target position.

9. The image pickup apparatus according to claim 1, the one or more processors being configured to set a signal readout area in the image pickup device according to the target position.

10. A method of adjusting an image pickup apparatus including an image pickup optical system including a fish-eye lens, and an image pickup device that is configured to be capable of moving a position thereof relative to the image pickup optical system, and converts an object image formed through the image pickup optical system to electric signals, the method comprising:
acquiring characteristics of the image pickup device;
acquiring an imaging position of the object image on the image pickup device; and
determining a target position to which the image pickup device is to be moved, based on the acquired characteristics of the image pickup device, and the acquired imaging position,
wherein the characteristics include information on defective pixels included in the image pickup device, and
wherein the target position is determined such that the number of defective pixels in an imaging area of the object image is smaller after moving the image pickup device to the target position than before moving the image pickup device to the target position.

11. An image pickup apparatus comprising:
an image pickup optical system including a fish-eye lens;
an image pickup device that is configured to be capable of moving a position thereof relative to the image pickup optical system, and converts an object image formed through the image pickup optical system to electric signals;
one or more processors connected to a memory, the one or more processors being configured to:
acquire characteristics of the image pickup device;
acquire an imaging position of the object image on the image pickup device; and determine a target position to which the image pickup device is to be moved, based on the acquired characteristics of the image pickup device, and the acquired imaging position, wherein the characteristics include information on luminance unevenness on an imaging surface of the image pickup device, and wherein the one or more processors are configured to determine the target position such that the luminance unevenness in an imaging area of the object image is smaller after moving the image pickup device to the target position than before moving the image pickup device to the target position.

* * * * *